(No Model.)
J. HARMAN.
ATTACHMENT FOR PLOWS AND CULTIVATORS.
No. 280,615. Patented July 3, 1883.
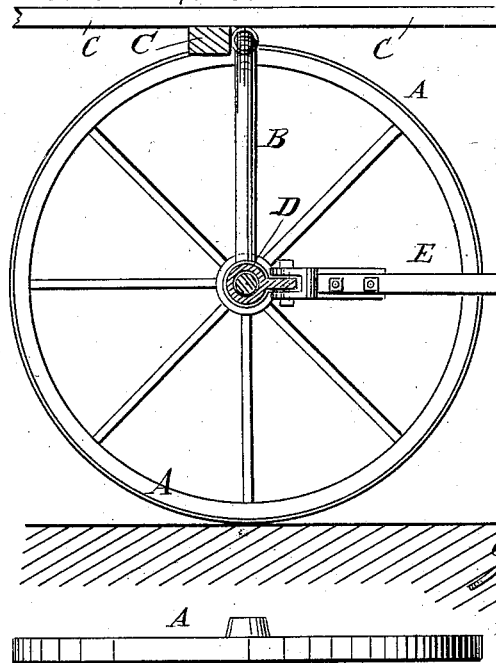
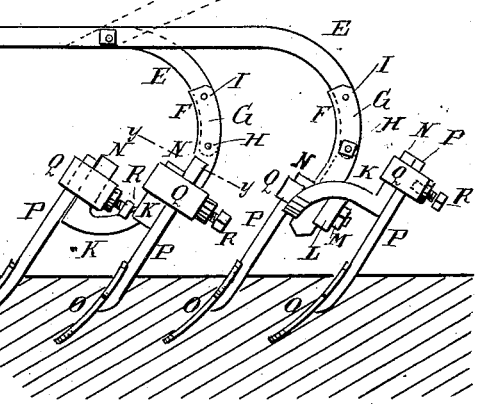
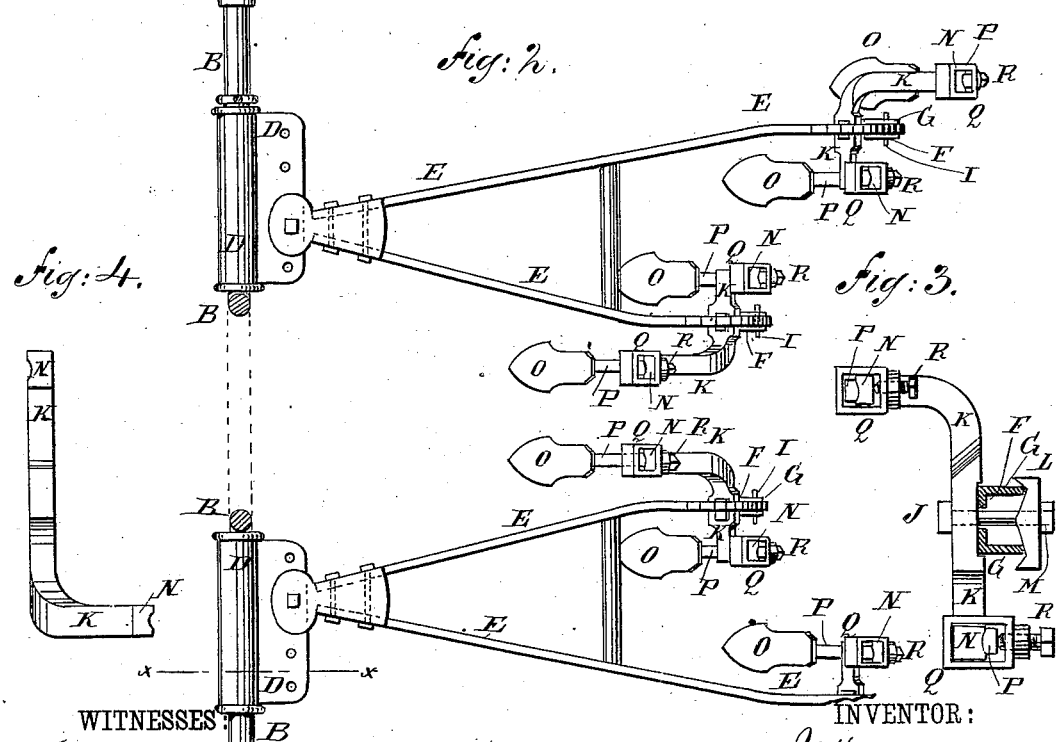
WITNESSES:
Chas. C. Nida
C. Sedgwick
INVENTOR:
J. Harman
BY
ATTORNEYS.

UNITED STATES PATENT OFFICE.

JONATHAN HARMAN, OF SOLOMON CITY, KANSAS.

ATTACHMENT FOR PLOWS AND CULTIVATORS.

SPECIFICATION forming part of Letters Patent No. 280,615, dated July 3, 1883.

Application filed March 27, 1883. (No model.)

*To all whom it may concern:*

Be it known that I, JONATHAN HARMAN, of Solomon City, in the county of Dickinson and State of Kansas, have invented a new and useful Improvement in Attachments for Corn Plows and Cultivators, of which the following is a full, clear, and exact description.

Reference is to be had to the accompanying drawings, forming a part of this specification, in which similar letters of reference indicate corresponding parts in all the figures.

Figure 1 is a side elevation of my improvement shown as applied to a cultivator, the cultivator being shown in section through the line *x x*, Fig. 2. Fig. 2 is a plan view of the same, parts being broken away. Fig. 3 is a sectional plan view of a part of the same, taken through the line *y y*, Fig. 1, and showing a forward cross-bar and its attachments; and Fig. 4 is a plan view of a rear cross-bar.

The object of this invention is to secure a thorough cultivation of land while leaving the ground in the rear of the machine level.

The invention consists in an attachment for corn plows and cultivators constructed with flanged and slotted bars attached to the plow-beams, and having secured to them cross-bars having one arm horizontal and the other curved, and provided at their ends with upwardly-projecting rearwardly-inclined lugs, to which the plow-shanks are secured by bands and set-screws, as will be hereinafter fully described.

A represents the wheels, B the arched axle, C the frame, D the plow-beam couplings, and E the plow-beams, of an ordinary cultivator. The plow-beams E are connected in pairs, one of each pair being shorter than the other, and have their rear ends curved downward in the ordinary manner.

Upon the forward side of the lower end of each plow-beam E is fitted a bar, F, having wings or flanges G upon its sides to overlap the sides of the said beam. The bar F is secured at its middle part to the lower end of the beam E by a bolt, H, which passes through the flanges G and the said beam, and at its upper end by a wooden pin, I, of sufficient strength to support the draft-strain under ordinary circumstances, but which, should the plows strike an obstruction, will break and allow the said plows to swing back to prevent the plows from being broken. The part of the flanged bar F that projects below the end of the beam E is slotted longitudinally to receive the bolt J, which passes through the middle part of the cross-bar K and through a washer, L, placed upon the edges of the flanges G, and has a nut, M, screwed upon its end. The washer L has grooves upon its inner side to receive the edges of the flanges G and prevent the said washer from turning. With this construction, by loosening the nuts M, the cross-bars K can be raised and lowered to regulate the depth at which the plows work in the ground. The inner arms of the rear cross-bars K and the outer arms of the forward cross-bars K are horizontal. The outer arms of the rear cross-bars K are curved upward and backward, and the inner arms of the forward cross-bars K are curved downward and forward.

Upon the ends of the cross-bars K are formed lugs N, which project upward, and are inclined to the rearward to give the proper inclination to the plows.

O are the plows, which are made about six inches long and three inches wide, and have shanks P, of round iron, attached to them. One of the sides of the shanks P rests against the lugs N of the cross-bars K, which are concaved to receive it, so that the plows can be turned to throw soil toward or from the plants, as may be required. The shanks P are clamped to the lugs N by bands Q, placed around them, and provided with set-screws R, so that the plows will be held securely and can be readily adjusted to throw soil around or from the plants, and to work deeper or shallower in the ground. The cross-bars K are made of such a length and are so arranged that the furrows will be about six inches apart from center to center, and that a line joining the points of adjacent plows will be about nine inches long.

The attachments thus constructed can be applied to any ordinary corn plow or cultivator.

Having thus described my invention, I claim as new and desire to secure by Letters Patent—

1. In an attachment for plows and cultivators, the bar F, having side flanges and a slot, said bar embracing the lower end of the plow-beam, and pivoted at about its middle to the latter, in combination with the bolt J, grooved washer L, and cross-bar K, having at the ends upwardly-projecting lugs N, and the bands and set-screws Q R, substantially as and for the purpose set forth.

2. In an attachment for plows and cultivators, the combination, with the bars F, connected to the plow-beams, and having vertical slots and washers L and bolts J, of the cross-bars K, having middle horizontal portions, with one end curved longitudinally and extended to the front or rear, said extensions having upward-inclined lugs N at their free ends, the latter being adapted to be connected to the plow-shanks, substantially as and for the purpose set forth.

JONATHAN HARMAN.

Witnesses:
   G. A. ROGERS,
   W. T. HARRIS.